United States Patent [19]

Takago et al.

[11] Patent Number: 5,177,131

[45] Date of Patent: Jan. 5, 1993

[54] ROOM TEMPERATURE CURING COMPOSITION

[75] Inventors: Toshio Takago, Annaka; Hiroshi Inomata, Takasaki; Hirofumi Kishita, Annaka; Shinichi Sato, Annaka; Hitoshi Kinami, Annaka; Koichi Yamaguchi, Takasaki; Takashi Matsuda, Annaka; Hirokazu Yamada, Annaka, all of Japan

[73] Assignee: Shin-Etsu Chemical Co., Ltd., Tokyo, Japan

[21] Appl. No.: 727,120

[22] Filed: Jul. 9, 1991

[30] Foreign Application Priority Data

Jul. 10, 1990 [JP] Japan .................. 2-182383
Aug. 3, 1990 [JP] Japan .................. 2-206531

[51] Int. Cl.⁵ ............................... C08K 5/34
[52] U.S. Cl. ........................ 524/100; 524/165; 524/166; 524/168; 524/157; 524/217; 524/242; 524/218; 524/718; 524/720; 524/723; 528/35; 528/901
[58] Field of Search ............. 528/35, 901; 524/165, 524/157, 168, 166, 242, 100, 217, 218, 720, 718, 723

[56] References Cited

U.S. PATENT DOCUMENTS

| | | | |
|---|---|---|---|
| 3,464,937 | 9/1969 | Bamford et al. | 260/18 |
| 4,652,624 | 3/1987 | Allen et al. | 528/17 |
| 4,888,380 | 12/1989 | Kamis et al | 528/35 |
| 4,888,404 | 12/1989 | Klosowski et al. | 528/35 |
| 4,898,910 | 2/1990 | Kamis et al. | 528/35 |
| 5,087,720 | 2/1992 | Kishita et al. | 556/434 |

Primary Examiner—Melvyn I. Marquis
Attorney, Agent, or Firm—Oblon, Spivak, McClelland, Maier & Neustadt

[57] ABSTRACT

The present room temperature curing composition comprises an organopolysilethylenesiloxane represented by the following general formula:

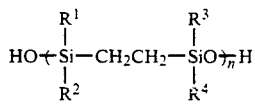

wherein $R^1$ to $R^4$ each represent an alkyl having up to 8 carbon atoms or a phenyl group and n is an integer of 10 or above, and an organosilane or an organosiloxane having two or more hydrolyzable groups such as alkoxy groups in the molecule. The composition can form a cured product high in rubber strength and excellent in chemical resistance.

11 Claims, No Drawings

ROOM TEMPERATURE CURING COMPOSITION

BACKGROUND OF THE INVENTION

1. Field of the Invention

The present invention relates to a room temperature curing composition that will readily be cured by the action of water.

2. Description of the Prior Art

Conventionally, room temperature curing organopolysiloxane compositions are known which can be stored under the closed condition stably with the flowability retained and can be cured to elastomeric bodies at room temperature by the action of moisture when exposed to the atmosphere. These compositions are widely used, for example, as sealing materials, coating materials, and adhesives in the fields of building industry, engineering industry, electrical industry, etc.

The above-mentioned conventional room temperature curing organopolysiloxane compositions have, however, defects that after the curing the rubber strength is weak and the durability against acid compounds and basic compounds is poor.

SUMMARY OF THE INVENTION

Therefore, an object of the present invention is to provide a room temperature curing composition which, after the curing, is high in rubber strength and excellent in chemical resistance.

The present room temperature curing composition comprises (A) an organopolysilethylenesiloxane whose both ends are blocked with hydroxyl groups, represented by the following general formula [I]:

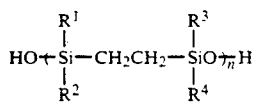

[I]

wherein $R^1$ to $R^4$, which may be the same or different, each represent an unsubstituted or substituted monovalent hydrocarbon group having 1 to 10 carbon atoms and n is an integer of 10 or above
and (B) at least one compound selected from the group consisting of organosilanes and organosiloxanes having two or more hydrolyzable groups in the molecule.

The composition can form a cured product high in rubber strength and excellent in resistance to acids, alkalis, and the like.

DETAILED DESCRIPTION OF THE INVENTION

In the present invention, the organopolysilethylenesiloxane used as a base component is represented by the above general formula [I] and as apparent from the general formula, the both ends of the molecular chain are blocked with hydroxyl groups.

In the general formula [I], each group of $R^1$ to $R^4$ is a substituted or unsubstituted monovalent hydrocarbon group having 1 to 10 carbon atoms and examples thereof are a lower alkyl group having 8 or less carbon atoms such as a methyl group, an ethyl group, a propyl group, and a butyl group, a cycloalkyl group such as a cyclohexyl group, an alkenyl group such as a vinyl group, an allyl group, a propenyl group, and a butenyl group, an aryl group such as a phenyl group, a tolyl group, and a naphthyl group, an aralkyl group such as a benzyl group and a 2-phenyl group, and a group formed by substituting part or all of the hydrogen atoms of these groups by halogen atoms or cyano groups such as a 2-cyanoethyl group, a 3,3,3-trifluoropropyl group, a 6,6,6,5,5,4,4,3,3-nonafluorohexyl group, a chloromethyl group, and a 3-chloropropyl group. These groups of $R^1$ to $R^4$ may be the same or different.

In the present invention, $R^1$ to $R^4$ preferably each represent a group having 1 to 8 carbon atoms, particularly preferably a lower alkyl group having 8 or less carbon atoms or a phenyl group.

In the general formula [I], n is an integer of 10 or over, preferably an integer of 10 to 5,000, and most preferably an integer of 10 to 1,000. In conjunction with such a value of n, the viscosity of the organopolysilethylenesiloxane of the component (A) at 25° C. falls to 25 cSt or over, preferably in the range of 25 to 1,000,000 cSt, and most preferably 1,000 to 100,000 cSt.

Organopolysilethylenesiloxanes particularly preferably used in the present invention are:

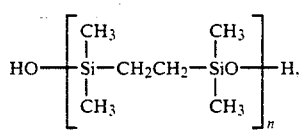

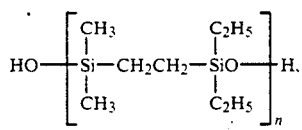

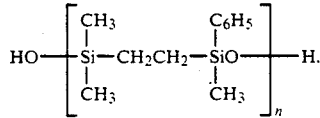

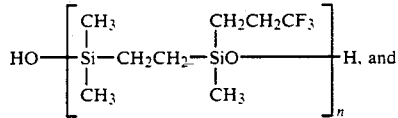

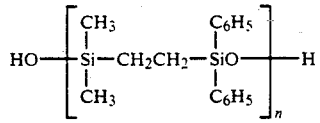

wherein, in the above formulas, n is an integer of 10 to 5,000.

The above organopolysilethylenesiloxanes may be used singly or as a mixture of two or more.

Components (B)

In the present invention, in combination with the above organopolysilethylenesiloxane, an organosilane and/or an organosiloxane having at least two hydrolyzable groups in the molecule is used. The hydrolyzable groups act as reaction active sites to cause a crosslinking reaction to take place between the hydroxyl groups of both ends of the molecular chain of the organopolysilethylenesiloxane and the organosilane or the organosiloxane. Examples of such a hydrolyzable group include an alkoxy group such as a methoxy group, an ethoxy group, a propoxy group, a methoxyethoxy group, and an ethoxyethoxy group; an acyloxy group such as acetoxy group, a propionoxy group, and a butyloxy group; an alkenyloxy group such as a propenyloxy group and an isobutenyloxy group; an iminoxy group such as a dimethylketoxime group, a methylethylkotoxime group, a diethylketoxime group, a cyclopentanoxime group, and a cyclohexanoxime group; an amino group such as an N-methylamino group, an N-ethylamino group, an N-propylamino group, an N-butylamino group, an N,N-dimethylamino group, and an N,N-diethylamino group; an amido group such as an N-methylacetamido group and an N-ethylacetamido group; and an aminooxy group such as an N,N-dimethylaminooxy group and an N,N-diethylaminooxy group.

Besides these hydrolyzable groups, the substituent bonded to the silicon atom includes an unsubstituted or substituted monovalent hydrocarbon group having 1 to 10 carbon atoms like those mentioned for $R^1$ to $R^4$ in the general formula [I]

Specific examples of the organosilane and the organosiloxane having at least two hydrolyzable groups mentioned above are the following:

The organosilane includes, for example, an alkoxysilane such as methyltrimethoxysilane, vinyltriethoxysilane, phenyltrimethoxysilane, 3,3,3-trifluoropyrutrimethoxysilane, tetraethoxysilane, and tetraethoxysilane, and a partially hydrolyzed product thereof; a trioximosilane such as methyltris(methylethylketoximo)silane and vinyltris(methylethylketoximo)silane; an acetoxysilane such as methyltriacetoxysilane, ethyltriacetoxysilane, phenyltriacetoxysilane, 6,6,6,5,5,4,4,3,3-nonafluorohexyltriacetoxysilane, and tetraaectoxysilane; an isopropenoxysilane such as methyltriisopropenoxysilane, vinyltriisopropenoxysilane, phenyltriisopropenoxysilane, 6,6,6,5,5,4,4,3,3-nonafluorohexyltriisopropenoxysilane, and tetraisopropenoxysilane; a triaminosilane such as methyltris(diethylamino)silane and vinyltris(dicyclohexylamino)silane; an amidosilane such as methyltriethylacetamidosilane, phenyltrimethylacetamidosilane, and vinyldiethylacetamidosilane; and a trifluoroethoxysilane such as methyltris(2,2,2-trifluoroethoxy)silane, vinyltris(2,2,2-trifluoroethoxy)silane, and tetrakis(2,2,2-trifluoroethoxy)silane.

The organosiloxane includes, for example, an aminoxysiloxane such as 1,3,5,7-tetramethyl-1,3-dipropyl-5,7-bis(diethylaminoxy)cyclotetrasiloxane and 1,3,5,7-tetramethyl-1-propyl-3,5,7-tris(diethylamioxy)cyclotetrasiloxane.

In the present invention, among the above-mentioned organosilanes and organosiloxanes, particularly vinyltriethoxysilane and tetraethoxysilane and a partially hydrolyzed product of these, methyltris(methylethylketoxime)silane, methyltriacetoxysilane, vinyltriisopropenoxysilane, and 1,3,5,7-tetramethyl-1-propyl-3,5,7-tris(diethylaminoxy)cyclotetrasiloxane are preferably used.

These organosilanes and organosiloxanes may be used singly or as a mixture of two or more and generally it is preferable that they are used in an amount of 0.5 to 25 parts by weight, particularly 1 to 10 parts by weight, per 100 parts by weight of the organopolysilethylenesiloxane of the component (A). If the amount to be blended is less than the above range, sometimes the composition gels during its production or storage or the elastomeric body obtained therefrom will not exhibit the intended properties. On the other hand, if the amount to be blended exceeds the above range, the degree of shrinkage becomes large when the composition is cured and the elasticity of the cured product tends to lower.

Other Ingredients

The present composition may be blended with a surface active agent having at least one fluorine atom in the molecule (hereinafter referred to as a fluorine type surface active agent), thereby the stain resistance can be remarkably improved. That is, the cured product made of the present room temperature curing composition blended with a fluorine type surface active agent can effectively prevent dust or the like from adhering to the surface thereof.

As the fluorine type surface active agent, any fluorine type surface active agent can be used so long as it has at least one fluorine atom in the molecule and for example an amphoteric one, an anionic one, a cationic one, and a nonionic one can be used. In the present invention, specific examples of the fluorine type surface active agent that are preferably used are the following:

Amphoteric surface active agents represented by the following general formulas (a) to (e):

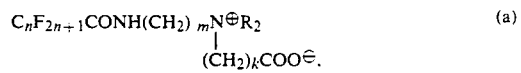

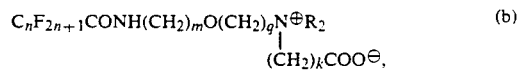

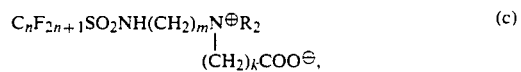

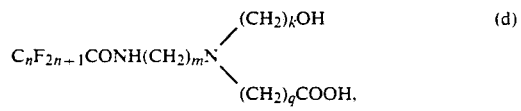

and

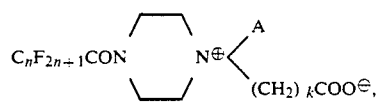

wherein, in the above formulas, R represents a monovalent organic group, for example, a monovalent hydrocarbon group, e.g., an alkyl group having 1 to 8 carbon atoms such as a methyl group and an ethyl group and an aryl group such as a phenyl group and a tolyl group; A represents a hydroxyalkyl group or an alkyl group having 1 to 8 carbon atoms, and n, m, k and q are each a positive integer.

Anionic surface active agents represented by the following general formulas (f) and (g):

wherein, in the above formulas, M represents a hydrogen atom or an alkali metal atom such as a sodium atom and a potassium atom, and n is a positive integer.

Cationic surface active agents represented by the following general formulas (h) and (i):

$$C_nF_{2n+1}SO_2NH(CH_2)_mN^{\oplus}R_3X^{\ominus}, \text{ and} \quad (h)$$

$$C_nF_{2n+1}COONH(CH_2)_mN^{\oplus}R_3X^{\ominus}. \quad (i)$$

wherein, in the above formulas, X represents a halogen atom and R, m, and n have the meaning defined above.

Nonionic surface active agents represented by the following general formula (j):

$$C_nF_{2n+1}SO_2NR(CH_2CH_2O)_pH \quad (j)$$

wherein p is an integer and R and n have the meaning defined above.

In the present invention, among the above surface active agents, amphoteric surface active agents are preferable and in particular amphoteric surface active agents represented by the above general formula (b) are preferably used. The most preferably used amphoteric surface active agent is one the surface tension of the 0.01 wt. % aqueous solution of which is 60 dyn/cm or less. The composition with which such a surface active agent has been blended is useful as a sealing agent, a coating agent, or the like in the field of building industry.

In the present invention, these fluorine type surface active agents are used singly or as a mixture of two or more and generally it is desirable that the fluorine type surface active agent is blended in an amount of 0.01 to 5.0 parts by weight, particularly 0.1 to 2.0 parts by weight, per 100 parts by weight of the component (A). If the amount is less than 0.01 part by weight, the intended effect of the stain resistance will not be secured to an adequate extent while if the amount exceeds 5.0 parts by weight, after the curing, the adhesion and the hardness and the mechanical strength of the sealant tend to lower.

In the present composition, it is preferable to blend a curing catalyst in order to effect the curing effectively at room temperature in the presence of moisture. As the curing catalyst, curing catalysts conventionally used for condensation curing organopolysiloxane compositions can be used and an organotin compound such as dibutyltin diacetate, dibutyltin octoate, dibutyltin dimethoxide, and tin dioctoate, a titanium compound such as tetraisopropoxy titanate and a guanidyl group containing silane such as tetramethylguanidylpropyltrimethoxysilane can be exemplified.

Generally it is desirable that the curing catalyst is blended in an amount of up to 5.0 parts by weight, particularly 0.1 to 1.0 part by weight, per 100 parts by weight of the component (A). If the amount is too excessive, not only the period for the formation of a coat becomes several seconds, which is quite short, lowering the workability, but also disadvantages such as a color change at the time of heating will occur sometimes.

Further, in the present composition, so long as the purposes of the present invention of, for example, improving the rubber strength after the curing are not damaged, additives that are conventionally used this type of composition can be blended. For example, a reinforcing agent such as fumed silica, precipitated silica, carbon powder, titanium dioxide, aluminum oxide, quartz powder, talc, sericite, and bentonite, a fibrous filler such as asbestos, glass fiber, and organic fibers, an oil resistance improver such as potassium methacrylate, a colorant, a heat resistance improver such as red oxide and cerium oxide, a cold resistance improver, a thixotropic agent such as polyethers, a dehydrating agent, an adhesion improver such as γ-aminopropyltriethoxysilane, and a fire retardancy improver such as platinum compounds may optionally be blended as required.

Room Temperature Curing Compositions

The present room temperature curing composition is obtained as a one-can room temperature curing composition by uniformly mixing the above components in a dry atmosphere. Also, the component (A) and the component (B) may be separately packaged to make the composition into a two-pack type thereby allowing them to be mixed when needed.

When the present composition is exposed to air, the crosslinking reaction proceeds by the moisture in the air and cures to form an elastomeric body. The elastomeric body is high in rubber strength and excellent in chemical resistance.

The present composition is useful as a sealing material and a coating material in building and civil engineering industries, also as an adhesive and a sealing material for electric and electronic parts, and as an FIPG material in automobile industry and also useful for a gas separating membrane represented by an oxygen enrichment membrane.

EXAMPLES

Now the present invention will be described with reference to Examples, wherein all the parts quoted represent parts by weight and all of the values of the viscosity were obtained at 25° C.

EXAMPLE 1

100 parts of a silethylenesiloxane polymer (viscosity: 2,500 cSt; specific gravity: 0.915; and refractive index: $n_D^{25}$ 1.4451) represented by the following formula:

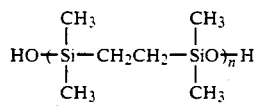

was mixed with 2.5 parts of ethyl polysilicate-40 and 0.5 part of $(CH_4H_9)_2Sn(OCOC_{11}H_{23})_2$ thereby preparing Composition I.

By using, in place of the above ethyl polysilicate-40, 2.0 parts of methyl silicate-51, Composition II was prepared similarly, and by using, in place of the above ethyl silicate-40, 3.0 parts of tetraisopropenoxysilane, Composition III was prepared similarly.

After each of the Compositions was deaerated under vacuum, the Composition was poured in a mold measuring 10 cm × 10 cm × 0.20 cm in internal dimensions, and the curability was investigated. After allowing them to stand for 16 hours at room temperature, all of them cured to transparent elastomeric bodies.

They were further allowed to cure for maturing for 2 days at room temperature and physical properties of the cured products were measured in accordance with JIS K-6301. The results of the measurement are shown in Table 1. The hardness was measured by using an A-model hardness spring-type testing machine of JIS K-6301. The same was followed in the Examples below.

TABLE 1

|  | Composition I | Composition II | Composition III |
|---|---|---|---|
| Pot life | 60 min | 20 min | 90 min |
| Hardness | 25 | 26 | 23 |

TABLE 1-continued

|  | Composition I | Composition II | Composition III |
|---|---|---|---|
| Elongation (%) | 350 | 310 | 380 |
| Tensile strength (kg/cm$^2$) | 38 | 37 | 32 |

EXAMPLE 2

100 parts of a silethylenesiloxane polymer (viscosity: 5750 cSt; specific gravity: 0.912; and refractive index: $n_D^{25}$1.4440) represented by the following formula:

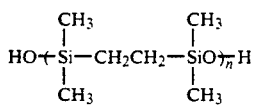

was mixed with 2.0 parts of ethyl polysilicate-40 and 0.5 part of $(CH_4H_9)_2Sn(OCOC_{11}H_{23})_2$ thereby preparing Composition IV.

After each of the Compositions was deaerated under vacuum, the Composition was poured in a mold measuring 12 cm ×12 cm ×0.10 cm in internal dimensions and was allowed to cure at room temperature. The composition had a pot life of about 60 min and after 16 hours it cured to a transparent elastomeric body.

After it was further cured for maturing for 6 days at room temperature, the mechanical strength and electrical properties were measured.

For comparison, in the same manner, using a dimethylpolysiloxane whose both ends are silanols and whose viscosity is 5,000 cSt, Composition V was prepared, and also its mechanical strength and electrical properties were measured. The results of the measurement are shown in Tables 2 and 3. The electrical properties were measured in accordance with JIS C-2123.

TABLE 2

|  | Composition IV silethylenesiloxane polymer | Comparative Composition V dimethylsiloxane polymer |
|---|---|---|
| Hardness | 20 | 23 |
| Elongation | 830% | 160% |
| Tensile strength | 127 kg/cm$^2$ | 4.7 kg/cm$^2$ |
| Tear strength | 16 kg/cm | 1.5 kg/cm |
| Specific gravity | 0.91 | 0.99 |

TABLE 3

|  | Composition IV silethylenesiloxane polymer | | Comparative Composition V dimethylsiloxane polymer | |
|---|---|---|---|---|
|  | Under normal conditions | After immersion in water for 24 hr | Under normal conditions | After immersion in water for 24 hr |
| Volume resistance (Ω cm) | 6.4 × 10$^{16}$ | 2.2 × 10$^{17}$ | 2.8 × 10$^{13}$ | 6.0 × 10$^{12}$ |
| Dielectric breakdown strength (KV/mm) | 21.5 | 22.5 | 20.6 | 20.8 |
| Dielectric constant |  |  |  |  |
| 60 Hz | 2.45 | 2.42 | 2.73 | 2.76 |
| 1 Hz | 2.44 | 2.41 | 2.73 | 2.76 |
| 100 KHz | 2.44 | 2.41 | 2.73 | 2.76 |

TABLE 3-continued

|  | Composition IV silethylenesiloxane polymer | | Comparative Composition V dimethylsiloxane polymer | |
|---|---|---|---|---|
|  | Under normal conditions | After immersion in water for 24 hr | Under normal conditions | After immersion in water for 24 hr |
| 1 MHz | 2.44 | 2.41 | 2.74 | 2.76 |
| Dielectric loss tangent (× 10$^{-4}$) |  |  |  |  |
| 60 Hz | 2.5 | 2.5 | 6.4 | 28 |
| 1 KHz | 2.8 | 3.7 | 1.3 | 1.8 |
| 100 KHz | 4.4 | 3.5 | 1.9 | 1.4 |
| 1 MHz | 7.0 | 6.1 | 3.1 | 1.4 |

From the above results, it can be understood that, in comparison with the cured product of a dimethylpoysiloxane, the cured product of the present composition using a silethylenesiloxane polymer has a considerably high strength. It is also understood that the electrical properties of the present composition are excellent in that the volume resistance of the cured product is 10$^3$ times as high as that of the comparative cured product and the permittivity of the cured product is lower than that of the comparative cured product by about 10%.

EXAMPLE 3

100 parts of a silethylenesiloxane polymer which was the same polymer as used in Example 1, 2.0 parts of ethyl polysilicate-40, 20 parts of diatomaceous earth, and 10 parts of calcium carbonate powder were mixed and were finally kneaded uniformly by a three-roll mill. The viscosity of the mixture was 15,500 cP.

To 100 parts of the mixture, 0.5 part of an emulsion catalyst (Catalyst RM, manufactured by Shin-Etsu Chemical Co., Ltd.) wherein $(C_4H_9)_2Sn(OCOC_{11}H_{23})_2$ is emulsified and dispersed in water was added and they were mixed uniformly and deaerated under vacuum, which was named Composition VI.

The Composition VI was poured into a mold measuring 14 cm × 17 cm × 0.20 cm in internal dimensions and was allowed to cure at room temperature. The Composition VI was good in flowability (self-leveling property), the pot life was about 40 min, and after 16 hours, it cured to an elastomeric body.

It was further cured for maturing for 2 days at room temperature and similarly to Example 2, the mechanical strength was measured.

For comparison, by using a dimethylpolysiloxane whose both ends are silanols and whose viscosity is 5,000 cSt, Composition VII was prepared in the same manner and the mechanical strength was measured similarly. The results of the measurement are shown in Table 4.

TABLE 4

|  | Composition IV silethylenesiloxane polymer | Comparative Composition V dimethylsiloxane polymer |
|---|---|---|
| Hardness | 34 | 48 |
| Elongation | 680% | 185% |
| Tensile strength | 180 kg/cm$^2$ | 35 kg/cm$^2$ |
| Tear strength | 10 kg/cm | 3 kg/cm |
| Specific gravity | 1.10 | 1.17 |

When a sheet (2 cm ×2 cm) of the cured product of the Composition VI was immersed in toluene for 3 days at room temperature, the volume swell was 260%. When the swelled sheet was kept under conditions of room temperature ×24 hr+105° C. ×1 hr to permit the solvent to dissipate, it was found that the change of the weight was −1.0%, indicating the curing was good. When the same test was carried out for the Composition VII, the volume swell was 280% and the change of the weight was −1.5%.

EXAMPLE 4

100 parts of a silethylenesiloxane polymer represented by the following formula:

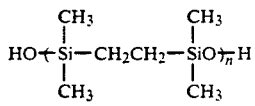

and having a viscosity of 2,020 cSt and 12 parts of fumed silica whose surface was treated with hexamethylsilazane and which had a specific surface area of 150 m²/g were mixed and after the mixture was passed through a three-roll mill once, 6 parts of methyltriisopropenoxysilane and 0.5 part of a guanidyl group containing silane represented by the following formula:

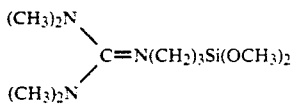

were added to the mixture, and they were deaerated and mixed under water-free conditions, thereby preparing Composition VIII.

The Composition VIII was molded into a sheet having a thickness of 2 mm and when the sheet was allowed to stand for 7 days in an atmosphere having a temperature of 20° C. and a relative humidity of 55%, the sheet cured to an elastomeric body.

The Composition VIII was stable for 6 months or more at room temperature under closed conditions. After the passage of the 6 months, the Composition VIII was molded into a sheet having a thickness of 2 mm and the sheet was allowed to cure to an elastomeric body under the same conditions as above.

Rubber physical properties of the elastomeric body obtained from the composition in the initial state and rubber physical properties of the elastomeric body obtained from the composition after 6 months of standing were measured in accordance with JIS K-6301. The results of the measurement are shown in Table 5.

TABLE 5

|  | Initial value | After 6 months of standing |
|---|---|---|
| Hardness | 29 | 31 |
| Tensile strength (Kg/cm²) | 95 | 102 |
| Elongation (%) | 680 | 720 |

The elastomeric bodies obtained from the Composition VIII in the initial state were immersed in concentrated sulfuric acid and an aqueous 20% sodium hydroxide solution respectively for 72 hr at 20° C. and rubber physical properties thereof were measured in accordance with JIS K-6301. The results of the measurement are shown in Table 6.

TABLE 6

|  | After immersion in concentrated sulfuric acid | After immersion in an aqueous 20% sodium hydroxide solution |
|---|---|---|
| Hardness | 31 | 25 |
| Tensile strength (Kg/cm²) | 87 | 83 |
| Elongation (%) | 720 | 750 |

EXAMPLE 5

100 parts of a silyethylenesiloxane polymer represented by the following formula:

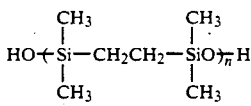

and having a viscosity of 4,870 cSt at 25° C. and 15 parts of sericite were mixed and passed through a three-roll mill once and then 0.1 part of ethyl polysilicate-40 and 0.1 part of dibutyltin dioctoate were added and they were deaerated and mixed to obtain Composition IX.

The Composition IX was formed into a sheet having a thickness of 2 mm. The sheet was allowed to stand for 3 days in an atmosphere having a temperature of 20° C. and a relative humidity of 55%, so that the sheet was cured to form an elastomeric body.

Rubber physical properties of the elastomeric body were measured in accordance with JIS K-6301. The results of the measurement are shown in Table 7.

TABLE 7

|  | Composition IX |
|---|---|
| Hardness | 41 |
| Tensile strength (Kg/cm²) | 56 |
| Elongation (%) | 580 |

EXAMPLE 6

100 parts of a silethylenesiloxane polymer represented by the following formula:

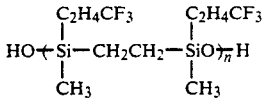

and having a viscosity of 20,500 cSt at 25° C. and 10 parts of fumed silica whose surface had been treated with dimethyldichlorosilane and whose specific surface area was 120 m²/g were mixed and passed through a three-roll mill once, then 6 parts of vinyltriacetoxysilane and 0.1 part of dibutyltin diacetate were added thereto, and they were deaerated and mixed under water-free conditions, thereby preparing Composition X.

The Composition X was formed into a sheet having a thickness of 2 mm. The sheet was allowed to stand for 7 days in an atmosphere having a temperature of 20° C. and a relative humidity of 55%, so that the sheet was cured to form an elastomeric body.

The Composition X was stable for 6 months or more at room temperature under closed conditions. After the passage of the 6 months, the Composition X was molded into a sheet having a thickness of 2 mm and the sheet was allowed to cure to form an elastomeric body under the same conditions as above.

Rubber physical properties of the elastomeric body obtained from the composition in the initial state and rubber physical properties of the elastomeric body obtained from the composition after 6 months of standing were measured in accordance with JIS K-6301. The results of the measurement are shown in Table 8.

TABLE 8

|  | In the initial state | After 6 months of standing |
|---|---|---|
| Hardness | 32 | 28 |
| Tensile strength (Kg/cm$^2$) | 58 | 53 |
| Elongation (%) | 520 | 690 |

EXAMPLE 7

100 parts of a silethylenesiloxane polymer represented by the following formula:

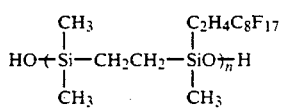

and having a viscosity of 11,300 cSt at 25° C. and 10 parts of fumed silica whose surface had been treated with dimethyldichlorosilane and whose specific surface area was 120 m$^2$/g were mixed and passed through a three-roll mill once, then 8 parts of vinyltrismethylethyl(ketoximo)silane and 0.1 part of dibutyltin diacetate were added thereto, and they were deaerated and mixed under water-free conditions, thereby preparing Composition XI.

The Composition XI was formed into a sheet having a thickness of 2 mm. The sheet was allowed to stand for 7 days in an atmosphere having a temperature of 20° C. and a relative humidity of 55%, so that the sheet was cured to form an elastomeric body.

The Composition XI was stable for 6 months or more at room temperature under closed conditions. After the passage of the 6 months, the Composition XI was formed into a sheet having a thickness of 2 mm and the sheet was allowed to cure to form an elastomeric body under the same conditions as above.

Rubber physical properties of the elastomeric body obtained from the composition in the initial state and rubber physical properties of the elastomeric body obtained from the composition after 6 months of standing were measured in accordance with JIS K-6301. The results of the measurement are shown in Table 9.

TABLE 9

|  | In the initial state | After 6 months of standing |
|---|---|---|
| Hardness | 35 | 38 |
| Tensile strength (Kg/cm$^2$) | 57 | 50 |
| Elongation (%) | 400 | 510 |

EXAMPLE 8

100 parts of a silethylenesiloxane polymer represented by the following formula:

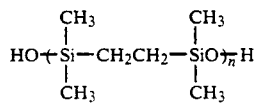

and having a viscosity of 2,020 cSt at 25° C. and 12 parts of fumed silica were mixed to prepare a base compound.

With the base compound, 6 parts of methyltributanoximesilane and 0.2 part of dibutyltin dioctoate and a surface active agent shown in Table in the indicated amount were mixed, thereby preparing Sealants 1 to 10. They were placed in respective containers that could be hermetically closed and stored in the sealed state.

TABLE 10

| | | Surface active agent | |
|---|---|---|---|
| Sealant | Base polymer | Type* | Used amount |
| 1 | Silethylenesiloxane | not added | 0 |
| 2 | Silethylenesiloxane | C$_3$F$_7$CONH(CH$_2$)$_3$N$^\oplus$Me$_2$ | 0.1 |
| 3 | Silethylenesiloxane | $\|$ | 0.5 |
| 4 | Silethylenesiloxane | (CH$_2$)$_k$COO$^\ominus$ | 1.0 |
| 5 | Silethylenesiloxane | C$_3$F$_7$COSO$_2$(CH$_2$)$_3$N$^\oplus$Me$_2$ | 0.1 |
| 6 | Silethylenesiloxane | $\|$ | 0.5 |
| 7 | Silethylenesiloxane | (CH$_2$)$_k$COO$^\ominus$ | 1.0 |
| 8 | Silethylenesiloxane | C$_3$F$_7$CONH(CH$_2$)$_3$N$^\oplus$Me$_3$.Cl$^\ominus$ | 0.1 |
| 9 | Silethylenesiloxane | | 0.5 |
| 10 | Silethylenesiloxane | | 1.0 |

*Remarks: Me represents a methyl group.

In the Table, the amount of the surface active agent is in parts by weight.

Next, the same procedure as above was repeated, except that, in place of the above silethylenesiloxane, a dimethylsiloxane whose both ends are blocked with hydroxyl groups and whose viscosity is 20,500 cSt was used to prepare a base polymer and the surface active agents shown in Table 11 given below were added to be mixed therewith in amounts shown in Table 11, thereby preparing Sealants 11 to 19. These Sealants 11 to 19 were placed in containers that can be hermetically closed and the containers were sealed and stored.

TABLE 11

| | | Surface active agent | |
|---|---|---|---|
| Sealant | Base polymer | Type* | Used amount |
| 11 | Dimethylsiloxane | C$_{12}$H$_{25}$—B—(OC$_2$H$_4$)$_3$OSO$_3$Na | 0.1 |

TABLE 11-continued

| Sealant | Base polymer | Surface active agent Type* | Used amount |
|---|---|---|---|
| 12 | Dimethylsiloxane | wherein B represents a | 0.5 |
| 13 | Dimethylsiloxane | paraphenylene group. | 1.0 |
| 14 | Dimethylsiloxane | $C_3F_7COSO_2(CH_2)_3N^{\oplus}Me_2$ | 0.1 |
| 15 | Dimethylsiloxane | $\|$ | 0.5 |
| 16 | Dimethylsiloxane | $(CH_2)_kCOO^{\ominus}$ | 1.0 |
| 17 | Dimethylsiloxane | $C_3F_7CONH(CH_2)_3N^{\oplus}Me_3 \cdot Cl^{\ominus}$ | 0.1 |
| 18 | Dimethylsiloxane | | 0.5 |
| 19 | Dimethylsiloxane | | 1.0 |

*Remarks: Sealants 11 to 19 are all Comparative Examples.

After each of the Sealants 11 to 19 obtained above was filled into a 15.cm space between opposed faces of two square granite plates (measuring $300 \times 300 \times 15$ mm) (the filled volume measuring $300 \times 300 \times 15$ mm), the sealants were allowed to cure to form test specimens.

The thus obtained test specimens were allowed to stand outdoors for 3 months, 6 months, and 12 months and then the occurrence of contamination on the surfaces and the peripheries of the cured products was examined. The results are shown in Table 12.

TABLE 12

| | The time when occurence of contamination was measured | | |
|---|---|---|---|
| Sealants | After 3 months | After 6 months | After 12 months |
| Examples | | | |
| 1 | a | a | c |
| 2 | a | a | a |
| 3 | a | a | a |
| 4 | a | a | a |
| 5 | a | a | b |
| 6 | a | a | a |
| 7 | a | a | a |
| 8 | a | a | b |
| 9 | a | a | a |
| 10 | a | a | a |
| Comparative Examples | | | |
| 11 | d | d | d |
| 12 | d | d | d |
| 13 | d | d | d |
| 14 | a | b | d |
| 15 | a | b | d |
| 16 | a | b | d |
| 17 | b | c | d |
| 18 | b | b | d |
| 19 | b | b | d |

In the Table, the evaluation was made as follows:

TABLE 12-continued

| Rating | Meaning |
|---|---|
| a: | Occurrence of contamination was not observed at all. |
| b: | Occurrence of contamination was not observed. |
| c: | Occurrence of slight contamination was observed. |
| d: | Occurrence of considerable contamination was observed. |

EXAMPLE 9

To 100 parts of the silethylsiloxane base compound prepared in Example 8, 0.2 part of dibutyltin octoate, 6 parts of methyltriacetoxysilane, and 0.5 part of a surface active agent shown in Table 13 were added, thereby preparing Sealants 20 to 22. The Sealants were placed in containers that were hermetically closable and the containers were sealed and stored.

Using the dimethylsiloxane base compound for comparison prepared in Example 8, Sealant 23 was prepared in the same manner as above and was stored in a sealed container similarly.

TABLE 13

| Sealant | Base polymer | Surface active agent Type* | Used amount |
|---|---|---|---|
| 20 | Silethylenesiloxane | $C_3F_7CONH(CH_2)_3N^{\oplus}Me_2$ $\|$ $(CH_2)_kCOO^{\ominus}$ | 0.5 |
| 21 | Silethylenesiloxane | $C_3F_7COSO_2(CH_2)_3N^{\oplus}Me_2$ $\|$ $(CH_2)_kCOO^{\ominus}$ | 0.5 |
| 22 | Silethylenesiloxane | $C_3F_7CONH(CH_2)_3N^{\oplus}Me_3 \cdot Cl^{\ominus}$ | 0.5 |
| 23 | Dimethylsiloxane | $C_3F_7CONH(CH_2)_3N^{\oplus}Me_2$ $\|$ $(CH_2)_kCOO^{\ominus}$ | 0.5 |

*Remarks: Me represents a methyl group.

Using the thus obtained Sealants 20 to 23, test specimens were prepared in the same manner as in Example 8, they were exposed outdoors, and occurrence of contamination on them were examined. The results are shown in Table 14.

TABLE 14

| | The time when occurrence of contamination was measured | | |
|---|---|---|---|
| Sealants | After 3 months | After 6 months | After 12 months |
| Examples | | | |
| 20 | a | a | a |

TABLE 14-continued

| Sealants | After 3 months | After 6 months | After 12 months |
|---|---|---|---|
| 21 | a | a | b |
| 22 | a | a | c |
| Comparative Example 23 | a | b | d |

The rating of the evaluation has the same meaning as above.

EXAMPLE 10

60 parts of a silethylenesiloxane polymer represented by the following formula:

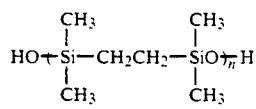

and having a viscosity of 1,210 cSt was added to 40 parts of calcium carbonate to prepare a base compound.

To the thus obtained compound, surface active compounds shown in Table 15 were added in indicated amounts and then 2.5 parts of a mixture made up of 95% by weight of a siloxane having the following formula:

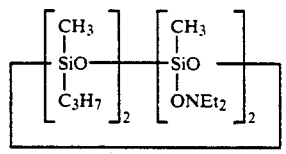

wherein Et represents an ethyl group, and 5% by weight of a siloxane represented by the following formula:

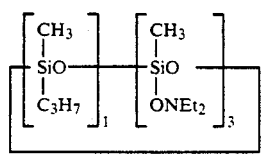

wherein Et represents an ethyl group, was mixed therewith, thereby preparing Sealants 24 to 32. The Sealants 24 to 32 were stored in sealed containers.

Using the diemthylsiloxane base compound for comparison prepared in Example 8, Sealants 33 to 35 were prepared in the same manner as above and were stored in sealed containers similarly.

TABLE 15

| Sealant | Base polymer | Surface active agent Type* | Used amount |
|---|---|---|---|
| 24 | Silethylenesiloxane | $C_3F_7CONH(CH_2)_3N^\oplus Me_2$ | 0.1 |
| 25 | Silethylenesiloxane | \| | 0.5 |
| 26 | Silethylenesiloxane | $(CH_2)_kCOO^\ominus$ | 1.0 |
| 27 | Silethylenesiloxane | $C_3F_7COSO_2(CH_2)_3N^\oplus Me_2$ | 0.1 |
| 28 | Silethylenesiloxane | \| | 0.5 |
| 29 | Silethylenesiloxane | $(CH_2)_kCOO^\ominus$ | 1.0 |
| 30 | Silethylenesiloxane | $C_3F_7CONH(CH_2)_3N^\oplus Me_3.Cl^\ominus$ | 0.1 |
| 31 | Silethylenesiloxane |  | 0.5 |
| 32 | Silethylenesiloxane |  | 1.0 |
| 33* | Dimethylsiloxane | $C_3F_7CONH(CH_2)_3N^\oplus Me_2$ | 0.1 |
| 34* | Dimethylsiloxane | \| | 0.5 |
| 35* | Dimethylsiloxane | $(CH_2)_kCOO^\ominus$ | 1.0 |

*Remarks: Sealants 33 to 35 are Comparative Examples.

Using the thus obtained Sealants 24 to 35, test specimens were prepared in the same manner as in Example 8, they were exposed outdoors, and occurrence of contamination on them were examined. The results are shown in Table 16.

TABLE 16

| Sealants | After 3 months | After 6 months | After 12 months |
|---|---|---|---|
| Examples | | | |
| 24 | a | a | c |
| 25 | a | a | b |
| 26 | a | a | a |
| 27 | a | a | c |
| 28 | a | a | b |
| 29 | a | a | a |
| 30 | a | a | d |
| 31 | a | a | c |
| 32 | a | a | c |
| Comparative Examples | | | |
| 33 | b | c | d |
| 34 | b | c | d |
| 35 | a | d | d |

The rating of the evaluation has the same meaning as above.

We claim:

1. A room temperature curing composition comprising
   (A) an organopolysilethylenesiloxane whose both ends are blocked with hydroxyl groups, represented by the following general formula [I]:

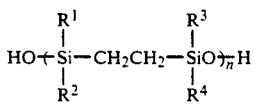

wherein $R^1$ to $R^4$, which may be the same or different, each represent an unsubstituted or substituted monovalent hydrocarbon group having 1 to 10 carbon atoms and n is an integer of 10 or above
and
(B) at least one compound selected from the group consisting of organosilanes and organosiloxanes having two or more hydrolyzable groups in the molecule.

2. A room temperature curing composition as claimed in claim 1, wherein in said formula [I] representing the organopolysilethylenesiloxane (A) each of $R^1$ to $R^4$ are selected from the group consisting of a lower alkyl group having up to 8 carbon atoms, a phenyl group, a lower alkyl group wherein some or all of the hydrogen atoms are replaced by halogen atoms and a phenyl group wherein some or all of the hydrogen atoms have been replaced by halogen atoms.

3. A room temperature curing composition as claimed in claim 2, wherein said organopolysilethylenesiloxane (A) comprises at least one selected from the group consisting of

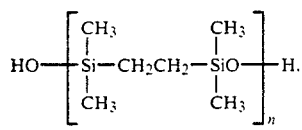

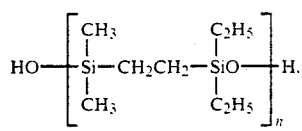

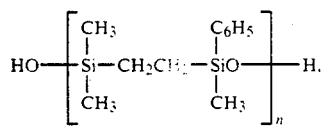

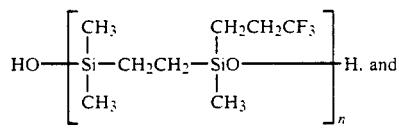

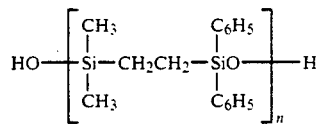

wherein, in the above formulas, n is an integer of 10 to 5,000.

4. A room temperature curing composition as claimed in claim 1, wherein the composition (B) is contained in an amount of 0.5 to 25 parts by weight per 100 parts by weight of the component (A).

5. A room temperature curing composition as claimed in claim 4, wherein the component (B) has at least one hydrolyzable group selected from the group consisting of an alkoxy group, an acyloxy group, an alkenyloxy group, an iminoxy group, an amino group, an amido group, and an aminooxy group.

6. A room temperature curing composition as claimed in claim 1, which further comprises an amphoteric, anionic, cationic or nonionic surface active agent having at least one fluorine atom in the molecule.

7. A room temperature curing composition as claimed in claim 6, wherein said fluorine atom containing surface active agent is contained in an amount of 0.01 to 5.0 parts by weight per 100 parts by weight of the organopolysilethylenesiloxane (A).

8. A room temperature curing composition as claimed in claim 7, wherein said fluorine atom containing surface active agent is an amphoteric surface active agent.

9. A cured product obtained by curing a room temperature curing composition as claimed in claim 1.

10. A room temperature curing composition, comprising
(A) at least one organopolysilethylenesiloxane whose both ends are blocked with hydroxyl groups, represented by the following general formula [I]:

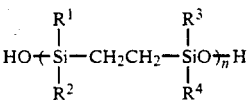

wherein $R^1$ to $R^4$, which may be the same or different, each represent an unsubstituted or substituted monovalent hydrocarbon group having 1 to 10 carbon atoms and n is an integer of 10 or above
and
(B) at least one compound selected from the group consisting of alkoxysilanes, partially hydrolyzed alkoxysilanes, trioximosilanes, acetoxysilanes, isopropeneoxysilanes, triaminosilanes, amidosilanes, trifluoroethoxysilanes and aminoxysiloxanes having two or more hydrolyzable groups in a molecule.

11. A room temperature curing composition according to claim 10, wherein (B) is selected from the group consisting of vinyltriethoxysilane, tetraethoxysilane, partially hydrolyzed vinyltriethoxysilane, partially hydrolyzed tetraethoxysilane, methyltris(methylethylketoxine)silane, methyltriacetoxysilane, vinyltriisopropeneoxysilane and 1, 3, 5, 7-tetramethyl-1-propyl-3,5,7-tris(diethylaminoxy)cyclotetrasiloxane.

* * * * *